United States Patent
Caprella et al.

(10) Patent No.: US 7,636,848 B2
(45) Date of Patent: Dec. 22, 2009

(54) METHOD, SYSTEM, NETWORK AND COMPUTER PROGRAM PRODUCT FOR SECURING ADMINISTRATIVE TRANSACTIONS OVER A NETWORK

(75) Inventors: Ettore Elio Caprella, Turin (IT); Paolo De Lutiis, Turin (IT); Manuel Leone, Turin (IT); Pier Luigi Zaccone, Turin (IT)

(73) Assignee: Telecom Italia S.p.A., Milan (IT)

( * ) Notice: Subject to any disclaimer, the term of this patent is extended or adjusted under 35 U.S.C. 154(b) by 406 days.

(21) Appl. No.: 10/580,438

(22) PCT Filed: Nov. 27, 2003

(86) PCT No.: PCT/EP03/13356

§ 371 (c)(1),
(2), (4) Date: May 24, 2006

(87) PCT Pub. No.: WO2005/053226

PCT Pub. Date: Jun. 9, 2005

(65) Prior Publication Data

US 2007/0071241 A1    Mar. 29, 2007

(51) Int. Cl.
*H04L 9/32* (2006.01)
*H04L 29/06* (2006.01)
*G06F 7/04* (2006.01)

(52) U.S. Cl. .............. 713/176; 713/157; 713/178; 713/180; 726/10

(58) Field of Classification Search .......... 713/176, 713/157, 178, 180
See application file for complete search history.

(56) References Cited

U.S. PATENT DOCUMENTS

| 4,672,572 | A | | 6/1987 | Alsberg |
| 4,964,164 | A | * | 10/1990 | Fiat .............................. 380/30 |
| 6,044,468 | A | | 3/2000 | Osmond |
| 6,842,863 | B1 | * | 1/2005 | Fox et al. ....................... 726/5 |

(Continued)

FOREIGN PATENT DOCUMENTS

| EP | 0 645 912 A2 | 3/1995 |
| EP | 0 935 365 A1 | 8/1999 |

OTHER PUBLICATIONS

Pfitzmann, et al., "Anonymity, Unobservability, and Pseudonymity—A Proposal for Terminolgy", Information Hiding Workshop PA, U.S.A., pp. 1-11, (Apr. 25-27, 2001).
Even, et al., "On-Line/Off-Line Digital Signatures", Journal of Cryptology, vol. 9, pp. 35-67, (1996).

*Primary Examiner*—William R Korzuch
*Assistant Examiner*—Aravind K Moorthy
(74) *Attorney, Agent, or Firm*—Finnegan, Henderson, Farabow, Garrett & Dunner, L.L.P.

(57) ABSTRACT

Communication between an administrator device and an administered device in a network is arranged in the form of a chain of digitally signed communication items including messages sent from an originator device to a recipient device. Each message has an associated respective digitally signed receipt, and the originator device is configured not to send a new item toward the recipient device in the absence of a respective digitally signed receipt for a previously sent item. With at least one, and preferably by both of the administrator device and the administered device, there is stored a history record of communication items exchanged therebetween. The history record is agreed upon and signed by both the administrator device and the administered device.

26 Claims, 6 Drawing Sheets

U.S. PATENT DOCUMENTS

| | | | |
|---|---|---|---|
| 7,478,236 B2 * | 1/2009 | Roh et al. | 713/157 |
| 7,487,359 B2 * | 2/2009 | Peyravian et al. | 713/178 |
| 7,519,824 B1 * | 4/2009 | Peyravian et al. | 713/178 |
| 7,539,861 B2 * | 5/2009 | Trench | 713/157 |
| 7,543,153 B2 * | 6/2009 | Wakao et al. | 713/180 |
| 7,555,652 B2 * | 6/2009 | Camenisch | 713/180 |
| 2003/0023851 A1 | 1/2003 | Peha | |
| 2003/0115457 A1 * | 6/2003 | Wildish et al. | 713/157 |

* cited by examiner

Fig_1

Fig_2

Fig_7

Fig_8

Fig_9

Fig_10

Fig_11

Fig_12

METHOD, SYSTEM, NETWORK AND COMPUTER PROGRAM PRODUCT FOR SECURING ADMINISTRATIVE TRANSACTIONS OVER A NETWORK

CROSS REFERENCE TO RELATED APPLICATION

This application is a national phase application based on PCT/EP2003/013356, filed Nov. 27, 2003, the content of which is incorporated wherein by reference.

FIELD OF THE INVENTION

The present invention deals with techniques for controlling transactions in administered systems.

The invention was developed by paying specific attention to the possible application to mitigating risks deriving from misuse of the privileges granted to system administrators operating their administered element from a remote terminal/workstation.

DESCRIPTION OF THE RELATED ART

Techniques currently adopted for controlling transactions in administered systems apply different approaches.

A first approach is based on a strict authorization control policy as provided e.g. in CiscoSecure ACS by Cisco combined with recording of the command requests and user ID from the administrators.

That approach does not fully resolve the problem of preventing misuse of privileges for a number of reasons.

First of all, in almost all current operational environments, the set of commands granted by the authorization control system for an administrators include some commands (possibly in combination with some parameter values) that may expose to risk the administered element.

In addition, the sequence of commands sent can make the difference between a beneficial and a hostile action. Authorization control based on a list of permitted/denied command sequences is hard to maintain and to be proved secure.

Finally, very fine-grained authorization policies fail in real environments because the privileged management overhead just adds a ring at the top of the security administration chain thus causing extra security management labor. Moreover, the newly created level keeps a manager busy in a day-to-day fine-grained privileged management.

These considerations mean that a need still exists for a deterrent measure if the approach in question is resorted to.

Another approach is based on recording the commands and results by using tools of the kind currently referred to as Network Forensics Analysis tools with eavesdropping-like features (as provided e.g. by NetIntercept by Sandstorm Enterprises) or a logging proxy-server located between the administrator client terminal/workstation and the administered element.

Still another approach provides for recording and digitally signing the log provided by the administered element as provided in the technique known as Sys-log sign.

Somewhat similar problems are tackled in US patent application US2003/0023851. Specifically, the document in question deals with e-commerce and mentions the possibility of resorting to a so-called "identity of the author" to separate the function of a first group of auditors that become aware of the contents of a certain message being exchanged and a second group of auditors that can associate with the message the identity of the sender or author. Specifically, the arrangement described in this prior art document provides for the presence of an intermediate element, designated the "notary".

In U.S. Pat. No. 4,672,572, the problem is tackled of collecting data concerning commands sent by users for accountability purposes. Essentially, U.S. Pat. No. 4,672,572 does not tackle the problem of demonstrating to a third party that the data collected have not been manipulated by certain entities such as (by using the same terminology used in the document in question) a user monitor, a command filter module or an auditor trail recording. Additionally, a number of proposals have been made in the scientific literature in order to solve the problem of providing so-called digital signatures in data streams. In fact, the intrinsic low efficiency of those solutions based on a public key, such as the arrangements known as RSA (Rivest Shamir Adleman) or ECC (Elliptic Curve Cryptosystem) has stimulated the search for new techniques that are typically based on faster signature algorithms, such as those referred to as one-time signatures or those based on the use of traditional periodical signatures. The one-time signature algorithms are characterised by a higher speed in comparison with conventional techniques, but this advantage is counterbalanced by the practical impossibility of using in a secure way a pair keys for more than one message (or, at most, for a very limited number of messages).

In an article by S. Even et al. entitled "On-line/Off-line Digital Signatures", Journal of Cryptology—(9) 1, 36-67, 1996 an arrangement is disclosed that further improves the signature dimension by associating hashes to entire blocks of bits in the message to be signed, while substituting complete hash chains for the single hashes. The first phase in the signature scheme can be performed off-line, before learning what message is to be signed. The second phase is performed on-line, is very fast and must be executed once the message to be signed is known.

In brief, the various approaches considered in the foregoing fail to meet the requirement for provable authenticity of the command sent: this is due to the traces of the commands sent by the system administrator not being (either or manually or digitally) signed by the originator or by an element under the full control of the originator.

In fact, each of the approaches considered in the foregoing may succeed in providing hard-to-deny proof of the exchanged commands, parameters and results, especially if the elements are ISO 15408 compliant in respect of the proper security requirements and components.

However, providing these systems with an appropriate degree of resistance to physical tampering is expensive and the effectiveness of such protection schemes would heavily depend on time, skills and resources available to the attackers.

If a company owns either of:
an authorization server,
a proxy-server or a sniffer element, or
a logging element
it may still obtain some benefits from tampering its own element while trying to hold the administrator responsible for the behaviour of the administered elements if e.g. the company decided to act as the attacker thus being in very good position for success.

In any case, all of the approaches considered in the foregoing are expensive to implement as they demand security measures in terms of design, implementation and operation environment for the elements. Also, an entity trusted by the administrator is still required for preventing/detecting attacks from the owners.

Essentially, the approaches considered in the foregoing trade in anonymity for security, allowing the administered element owner to possibly observe commands/administrator associations as he or she may want, thus failing to satisfy the requirement for a form of anonymity of provable strength against any unfair behaviour of the owner of the managed element.

OBJECT AND SUMMARY OF THE INVENTION

The present invention is intended to provide a viable response to a number of requirements/problems exhibited by the approaches considered in the foregoing, namely:

accountability of an administrator for the actions he or she carried out must to be provable with irrefutable evidence to any third party, e.g. when system administration is carried out by an outsourcer;

the inability of an administered element owner to associate each command sent by an administrator with the administrator identity must be proved to any third party, e.g. when the liberty and dignity of the administrators are taken into account;

command/administrator identity associations (including command captures recorded before obtaining approval and collaboration by a superior authority approval) must be revealed only when serious investigations have to be carried out and/or only after approval and collaboration of a superior authority;

under the same circumstances, command/administrator identity associations (including captures stored before obtaining approval and collaboration by a superior authority approval) must not be surreptitiously created either by a superior authority or by an administered element owner;

administrators and administered element owners should not be required to agree on trust in the correctness and effectiveness of any processing element outside their respective domains, while a common certification authority (CA) or cross-certified CAs can be resorted to.

According to the present invention, that object is achieved by means of the method having the features set forth in the claims that follow. The invention also relates to a corresponding system, a communication network incorporating such a system as well as a computer program product loadable in the memory of at least one computer and comprising software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one" computer is obviously intended to highlight the possibility for the arrangement of the invention to be implemented in a de-centralized fashion.

A preferred embodiment of the invention disclosed herein is thus a method of arranging communication between an administrator device and an administered device in a network. The method includes the steps of:

arranging communication in the form of a chain of digitally signed communication items including messages sent from an originator device to a recipient device, each said message having a respective digitally signed receipt, and configuring the originator device not to send a new item towards the recipient device in the absence of a respective digitally signed receipt for a previously sent item.

Preferably, the arrangement disclosed herein provides for a set of system administrators or operators being authorized to administer remotely a certain system element at a specific time, by letting an administrator in that set hiding his or her identity to the administered element owner by the use of e.g. group signatures or pseudonym digital certificate.

A preferred embodiment of the arrangement disclosed herein provides RSA class digital signature evidence for enforcing accountability of the administrator who created the signature and originated administrative commands sent—only if specified auditors are in charge of the investigations.

Additional preferred embodiments of the arrangement described herein provides RSA class digital signature evidence for enforcing accountability of the administered element owner who lets a specific device within his or her domain send to an administrator some messages signed on behalf of the administered element owner.

Preferably, the arrangement described herein requires that payload data (data as well as administrative commands) are accompanied by a valid digital signatures (to be verified by the recipient) created by means of the devices assigned ad personam and under the full control of the originator (the administrator or the administered element owner): as a consequence, the originator cannot be subsequently blamed for sending messages that he or she did not send.

Still preferably, a mechanism is provided to chain digitally signed messages with digitally signed receipts so that the originator can not be subsequently blamed for failing to send out a specified message within a given work session: in fact, an originator is expected never to send a new message without having previously received a valid receipt of the last message sent.

Preferably, in order to share a fully agreed upon and signed history of the exchanged messages (to be possibly shown to auditors), a closing step of the session is introduced; auditors will expect each session history to be accompanied by evidence of a proper closing step of the session having been performed.

In the absence of any valid acknowledgement/receipt sent back from the administered element owner (which might lead the administered element owner to successfully blame an administrator for failing to send a specified message), the administrator will be aware of the receipt being missing and will thus be expected to execute the session closing step while asking the recipient for a signed statement mentioning the last message received by the administered element owner and the last message sent by the administered element owner within that session. The closing step of the session will be initiated by the administrator (possibly within the framework of a session for that purpose) and will mention the last message received and the last message sent within that session.

Preferably, the administrator is expected to keep a log with the session number marked as "not closed" until the administered element owner has not sent back a signed acknowledgment to close the work session. The session closing step will be completed by the administered element owner (possibly within a specific session and opened for that purpose) and will mention the last message received and the last message sent within that session.

In the case a valid receipt from the administrator is missing (which might lead the administrator to successfully blame an administered element owner for failing to send a specified message), the administered element owner will be aware of the receipt being missing and will be expected to wait for a session closing step. In that case, the closing step will be initiated by the administrator (possibly within the framework of a session opened up for that purpose) and will mention the last message received and the last message sent within that session.

Also, the administered element owner will preferably keep a log with the session number marked as "not closed" until the administrator sends the missing signed message. In that case, the closing step in the session will be completed by the administered element owner (possibly within the framework of a specific session opened for that purpose) and will mention the last message received and the last message sent within that session.

A major advantage of the arrangement described lies in that the auditors are not required to choose which element under the control of a receiver to blindly trust (e.g. Administrator Computer or Administered element Owner Apparatus) in order to be assured about the fact that a specified message has been actually received by the receiver itself and about the genuine nature of the messages sent by any originator.

BRIEF DESCRIPTION OF THE ENCLOSED DRAWINGS

The invention will now be described, by way of example only, by referring to the enclosed figures of drawing, wherein.

DETAILED DESCRIPTION OF PREFERRED EMBODIMENTS OF THE INVENTION

The vocabulary used throughout the detailed description of preferred embodiments of the invention is essentially consistent with the terminology introduced in Pfitzmann et al. "Anonymity, Unobservability, and Pseudonimity—A Proposal for Terminology", Information Hiding Workshop PA, USA 25-27 April 2001.

Essentially, in the following a system will be referred to which provides apparatus and functionality for computer programs circulated over a network. Specifically, the system and method described herein is intended to support legitimate rights of both a service provider operation center owner and the system administrators.

Specifically, the arrangement described herein addresses the problem of providing undeniable evidence of the fact that e.g. some specified commands and parameters were sent through a telecommunication network from an administrator computer AC, under the control and within the domain of an administrator, to an administered element AE, within the domain of a different person, namely an administered element owner.

The arrangement described also addresses the problem of providing undeniable evidence of the fact that e.g. some specified data were or were not sent to the administrator computer AC through the communication network from the administered element AE which belongs to the domain of an administered element owner and is under the control of another person, namely the administrator.

Figure 1:
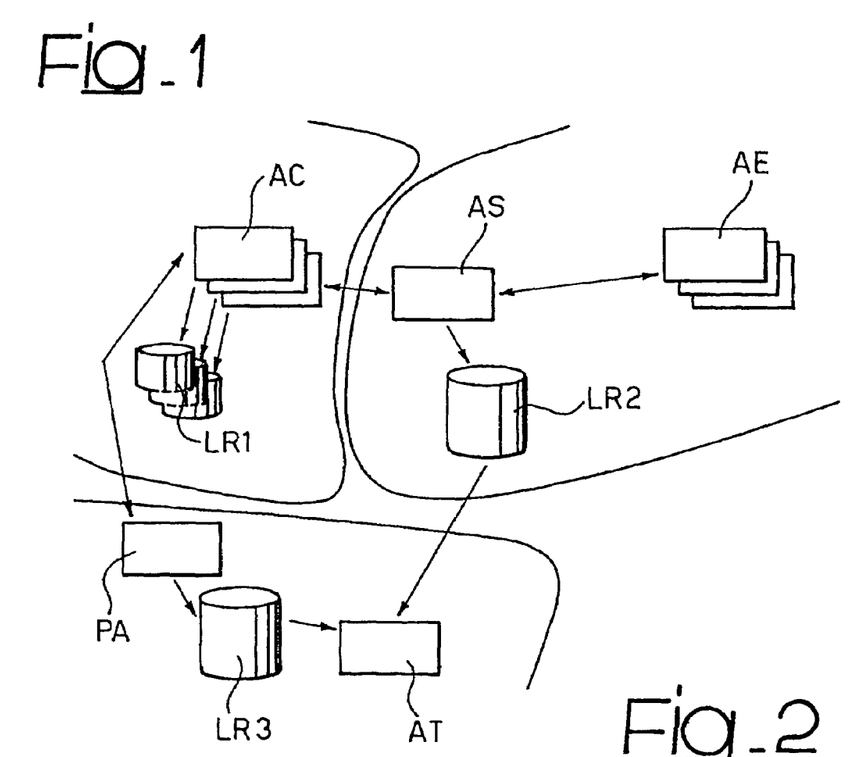
FIG. 1 is block diagram showing a typical scenario of use of the arrangement described herein.

Specifically, administrators are assumed to be provably able to reach the management interface of the administered element AE only via a telecommunication network and only through a specified apparatus, designated AS in FIG. 1.

Hereinafter, the designation "administered device" will be applied indifferently both to the element AE and to the apparatus AS in view of their very close cooperation.

For that purpose the administrator computer AC (or a signing device attached to it) holds a private key and a matching valid certificate (e.g. an X.509 certificate). The certificate proves the real identity of the administrator and was issued regularly by an entity trusted by the administrator.

Other entities shown in the block diagram of FIG. 1 will be described in the following. The core of the process described herein is represented by an engine 10, hereinafter referred to as a "solo" engine (see FIGS. 2 and 3, to be better described in the following).

Local repositories LR1 and LR2 are associated via respective modules 11 with the administrator computer AC and the administered device AS.

Additionally, reference PA designates an authority issuing digital certificates having associated a further repository LR3; AT designates an auditor tool adapted to interact with the repositories LR2 and LR3.

Figure 11:
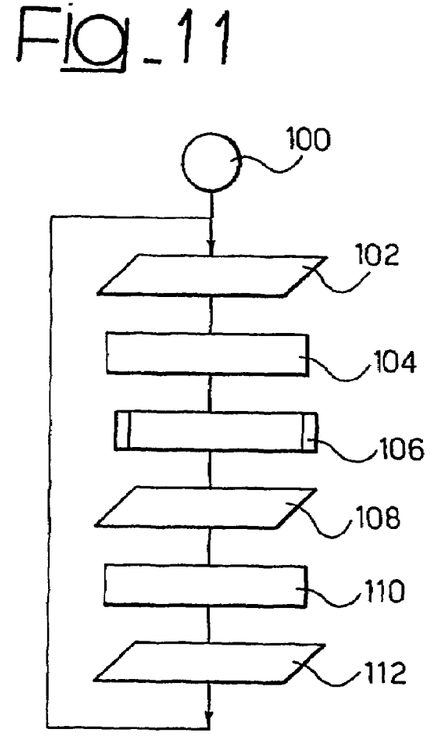
FIGS. 11 to 12 are flow charts further detailing operation of the arrangement described herein.
Figure 12:
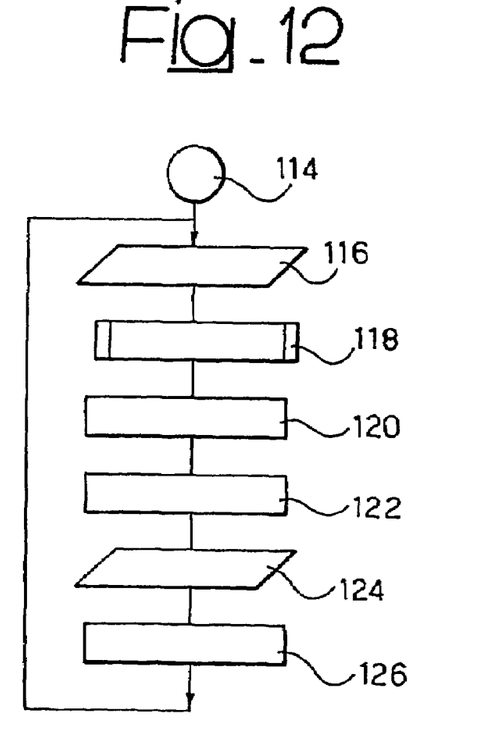

By way of general introduction, reference may be first had to the flow charts of FIGS. 11 and 12. These relate to the sequence of operations that the engine 10 performs in order to permit "signed" conversation between the administrator computer AC and the apparatus AS.

Also, it will be assumed that the arrangement described is adapted for use with protocols such as TELNET, SMTP, POP, HTTP and others.

The flow chart of FIG. 11 shows the basic procedure executed on both the administrator computer AC and the administered device AS to handle data exchanged between a user process (UP) running on the administrator computer AC and a user process daemon (UPD) running on the administered device AS.

It starts with a start step 100 where data are made available from a user process (UP) in the case of the administrator computer AC or from a user process daemon (UPD) in the case of the administered device AS.

Subsequently, a number of steps manage characters from the UP or the user procedure daemon (UPD).

Specifically, in a step 102 the characters are read while in a step 104 the PDU (Protocol Data Unit) to be signed is prepared. This is subsequently signed in a step 106 by means of a sign engine, and then sent in a step 108. In fact, the packet is sent to an encryption/decryption module 22, which in fact is transparent with respect to the process. The encryption/decryption module 22 will encrypt the signed packet and forward the encoded packet either to the administered device AS (in the case the procedure is running on the administrator computer AC) or to the administrator computer AC (in the case the procedure is running on the administered device AS).

In a step 110 the packet sent is logged to a local repository (LR1 or LR2, respectively—see e.g. FIG. 1), while the step designated 112 is a step wherein a receipt associated to PDU sent in a step 108 is waited for. This latter procedure is implemented in different manners in the administrator computer AC and in the apparatus AS due both to the asymmetric nature of a collision handling and to the adoption of a half-duplex or full-duplex communication channel, as detailed in the following with reference to FIG. 9.

The sequence of steps shown in FIG. 12 shows the basic procedure executed on both the administrator computer AC and the apparatus AS. It essentially refers to the management of characters arriving from the apparatus AS or the administrator computer AC through a communication channel.

Specifically, a start step 114 provides that signed PDUs are made available from the encryption/decryption module 22 which decrypts the encrypted packet coming through a network interface card (NIC) 24 and makes it available for the following step 116, in a step 116 the PDUs from the apparatus AS (in the case the procedure is executed on the administrator computer AC) or from the administrator computer AC (in the case the procedure is executed on the apparatus AS) are read and in a step 118 a check is made of the PDU received (signature, time, session and sequence numbers, and so on).

In a step 120 the PDU received is logged to a local repository (again, LR1 or LR2, respectively), while in a step 122 a receipt PDU is prepared and signed to be subsequently sent to the administrator computer AC or the apparatus AS in a step 124.

In a step 126, the application data received are sent to the UP (in the case the procedure is executed on the administrator computer AC) or UPD (in the case the procedure is executed on the apparatus AS) while received receipt is made available to procedure shown in FIG. 11.

Handling of the opening phase follows as better detailed in the following.

When wishing to establish a work session with an administered element AE the administrator launches, via a monitor/keyboard or other devices 12, a specified program namely a user process UP 14.

In a first embodiment, as a result of the process 14 sending out messages, the engine 10 requires an AC sign engine 16 to generate a pair of asymmetric keys (e.g. RSA). The sign engine 16 will in turn generate a complete pseudonym certificate request (e.g. PKCS#10) for the public key just created without including any references to the real identity of the administrator. The administrator computer AC will thus sign such a request with its personal private key.

For that purpose, the administrator can use its identity token 18 e.g. a smart card capable of securely storing his or her private key (e.g. RSA or DSA) and capable of calculating a proper digital signature (e.g. in PKCS#1 format) over the pseudonym certificate request. The sign engine 16 in the administrator computer AC will then create a cryptographic envelope (e.g. PKCS#7) comprising the signed request and the administrator certificate (or an identifier of it) matching the personal private key of the administrator. The administrator certificate was previously issued by a regular Public Key Infrastructure Certification Authority.

The sign engine 16 will then encrypt such a signed request (e.g. PKCS#7 or SSL) by using a crypto token 20 and pass such an encrypted signed request to the engine 10.

The engine 10 will forward the encrypted signed request to the pseudonym authority PA via an encryption/decryption engine 22 and the network interface card 24 in the administrator computer AC. Some known measures (such as e.g. ISO 7498-2) for preventing a traffic monitoring (e.g. so-called traffic padding) can be used when the communication path between the administrator computer AC and the authority PA is not protected from traffic monitoring.

For instance, in order to avoid observation from the administered element owner, a local "onion routing" approach can be adopted. For that purposes several administrator computers ACs and the PA may share the encrypted signed pseudonym certificate requests.

The authority PA will decrypt the signed pseudonym certificate request, will verify it and check the validity of the administrator signature and issue a pseudonym certificate. Also, the authority PA will encrypt the certificate (e.g. PKCS#7 or SSL) and will send such an encrypted pseudonym certificate to the administrator computer AC. The PA will log the signed pseudonym certificate request, the associated Administrator Certificate and the pseudonym certificate issued by the authority PA itself to the local repository LR3 in the domain of the PA as shown in FIG. 1. Should an audit session be required where association of the real identity of the Administrator to the PDUs stored in the repository LR3 in the domain of the Administered Element owner had to be proved, it will be possible for an Auditor to do it by using a the software and hardware tool named auditor tool or AT, the repository LR3 in the domain of the authority PA and the repository LR2 in the administered element owner domain (AS, AE).

Some known measures (e.g. ISO 7498-2) for preventing traffic monitoring (e.g. traffic padding) can be used when the communication path between the authority PA and the administrator computer AC is not protected from traffic monitoring.

It will be appreciated that a pseudonym certificate will contain a unique identifier and a validity time as short as requested by the administrator computer AC in its request. Administrator computers are expected to request certificates having a short validity time as they may not be allowed to ask for pseudonym certificate revocation if the matching private key is compromised for some reasons.

The engine 10 will handle the encrypted pseudonym certificate received from the authority PA and pass the encrypted pseudonym certificate to the sign engine 16 in the administrator computer AC. The engine in question will decrypt the encrypted pseudonym certificate, while possibly verifying the certificate and checking validity thereof.

Once the administrator computer AC has obtained a valid pseudonym certificate, it will be used as an AC session certificate and the engine 10 can start a handshake with the modules in the apparatus AS.

In a second embodiment where anonymity is not required or is achieved by other means (not included in the proposed system), as a result of the process 14 sending out messages, the engine 10 requires an AC sign engine 16 to use a private key on AC matching a valid personal administrator certificate previously issued by a regular Public Key Infrastructure will be used as an AC session certificate.

In a third embodiment as a result of the process 14 sending out messages, the engine 10 requires an AC sign engine 16 to use a private key belonging to a group signature scheme. The public group key will be used as an AC session certificate.

Figures 3, 4:
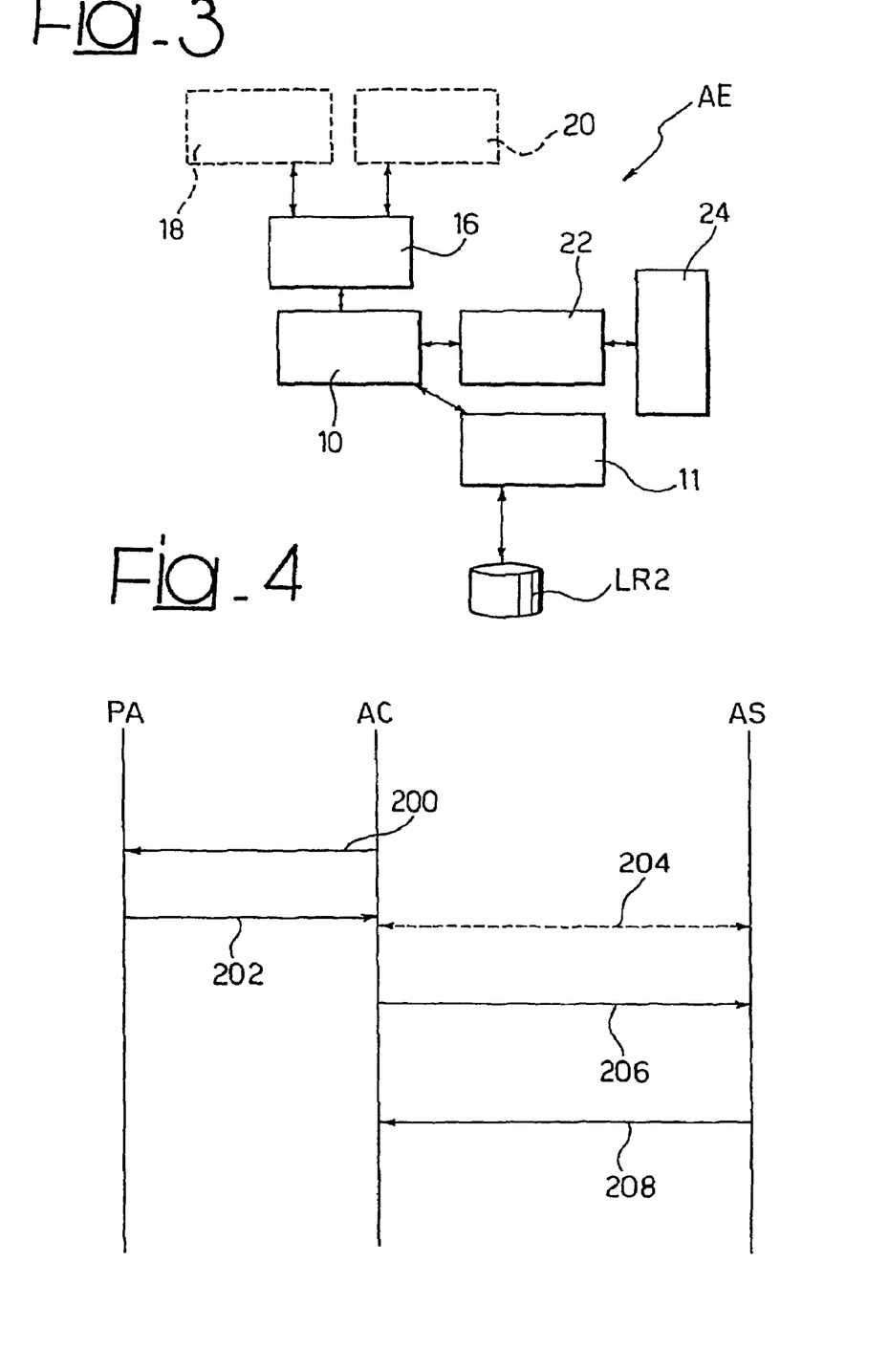
FIGS. 4 to 10 are sequence diagrams detailing operation of the arrangement described herein.

A detailed description of the handshake phase is provided in the sequence diagram of FIG. 4. The description applies to all of the three embodiments aforementioned.

After defining a proper background and achieving proper synchronization (by known means), while or just after requesting (step 200) and obtaining (step 202) an AC session certificate, the engine 10 requires the encryption/decryption module 22 to set up an end-to-end encrypted communication channel with the homologous module contained in the apparatus AS as portrayed in FIG. 3. This occurs in a step designated 204.

Figure 2:
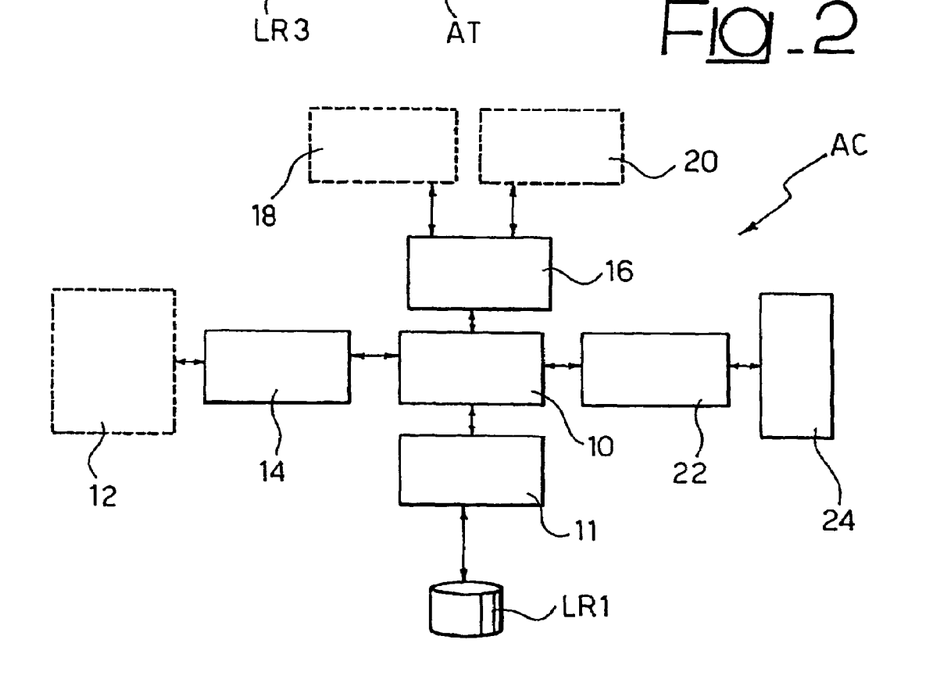
FIGS. 2 and 3 are two functional block diagrams showing the basic functional layout of the arrangement described herein.

It will be appreciated that in FIGS. 2 and 3 (relating to the administrator computer AC and the apparatus AS, respectively, the same reference numerals were used to designate identical or equivalent parts/modules). Specifically, such an end-to-end encrypted communication channel is up via the respective NIC interfaces (both designated 24).

The encryption/decryption modules 22 can be, for instance, a secure shell client capable of port forwarding or an IPSEC communication protocols stack.

A handshake step provides signed connection set-up and shares some parameters with the entities involved in the communication session, namely:
- digital certificates of the communicating parties,
- the initial time as known to each communicating party,
- the identifiers of the signature algorithm and version, hash algorithm and version,
- if a one-time signature scheme is used, then the first one-time (OT) public key of each party is exchanged with the other party, and
- unique session number.

As depicted in FIG. 4, the administrator computer AC sends (step 206) a handshake PDU to the apparatus AS and waits for a handshake response PDU therefrom (step 208).

Only these PDUs are accepted by the peers during this phase, while different messages may be silently discarded or cause the connection to be closed.

The handshake message comprises at least the following fields

| Pkt Length | Pkt Type | Protocol Version | Time | AC Session Number | Digital Certificate | First OT Key | Signature |
|---|---|---|---|---|---|---|---| where

Pkt_Length: PDU packet length

Pkt_Type: 00=handshake PDU packet

Protocol Version: a fixed length code identifying the initial digital signature algorithm, the initial hash algorithm, the initial signing key length used, the next message digital signature algorithm, the next message hash algorithm, the next signing key length used, the handshake type, the time representation format, the clock synchronization type, the maximum tolerated local time drift, the maximum tolerated AS time drift, local time precision, the session number field length.

Time: the current time and date (e.g. utc time)

AC_Session_Number: a random number which is randomly chosen according to the FIPS 140-2 standard Digital_Certificate: the AC session certificate;

First OT Key: the first public key the recipient will have to use for verifying the next message;

Signature: the digital signature obtained by using the private key matching the AC session certificate; the signature is performed over the previous concatenated fields.

The handshake response message comprises at least the following fields

| Pkt Length | Pkt Type | Protocol Version | Time | Receipt | Reason code | AS Session Number | Digital Certificate | First OT Key | Signature |
|---|---|---|---|---|---|---|---|---|---| where

Pkt_Length: PDU packet length

Pkt_Type: 04=handshake response PDU packet

Protocol_Version: a fixed length code identifying the initial digital signature algorithm, the initial hash algorithm, the initial signing length used, the next message digital signature algorithm, the next message hash algorithm, the next signing key length used, the handshake type, the time representation format, the clock synchronisation type, the maximum tolerated local time drift, the maximum tolerated AC time drift, the local time precision, the session number field length.

Time: the current time and date (e.g. utc time)

Receipt: the result of a hash function (e.g. Sha-1 or U-hash), applied to the handshake message just received.

Reason_Code: this is a code representing whether the session set-up has been refused (e.g. 00=session is allowed; 01=relying party protocol version is not acceptable; 02=relying party clock misalignment exceeds the specified limit; 04=relying party clock appears being back-dated; 08=digital certificate expired, 16=digital certificate not valid; 32=digital signature not valid).

AS_Session_Number: a random number which is randomly chosen according to the FIPS 140-2 standard Digital_Certificate: the digital certificate associated to AS;

First_OT_Key: the first public key the recipient will have to use for verifying the next sent message;

Signature: digital signature obtained by using the private key matching the AS certificate; the signature is performed over the previous concatenated fields. Once the initial set-up phase has been completed, each exchange payload data must be signed by the originator. The kind of information that will be included in a message is the following:

- payload data, i.e. data or commands and parameters exchanged between the AC user process (FIG. 2) and the AS captive shell (FIG. 3) or receipt (hash of the last message received),—the time of the originator,
- a sequence number,
- if a one time signature scheme is used, then the next one time (OT) public key used by the sending party will be included, and
- the signature of the previous concatenated fields.

The messages have the following format:

| Pkt Length | Pkt Type | Delta Time | Session Number | Sequence Number | Payload Data | Receipt | Next OT Key | OT Signature |
|---|---|---|---|---|---|---|---|---| where

Pkt Length: packet length

Pkt Type: type of packet namely data packet, receipt packet, data packet+receipt (for instance: 01 if the payload_data field is present, 02 if the receipt field is present, 03 if both payload and receipt fields are present)

Delta Time: time difference between the time reported in the message sent during the handshake phase and the actual time the command is signed Session Number: this is the session number derived from the session fields exchanged during the handshake (for instance the concatenation of the AC session number sent by the administrator computer in the handshake message and the AS session number sent by the apparatus AS in the response handshake message)

Sequence Number: progressive sequence number

Payload Data: application payload present in the data-type packets; this may contain commands and parameter values or application level data Receipt: this is a hash of the last packet received (present in the case of a receipt-type packet or a data-plus-receipt type packet)

Next OT Key: public key OT whose corresponding private key is used for signing the next message to be sent;

OT Signature: OT signature of all the previous concatenated fields.

Two different message formats are used for the session set-up phase and for the data exchange phase. In fact the protocol exploits in the handshake phase a type of signature that may be different from the signature used for the subsequent messages in the session in order to ensure anonymity and traceability of the various administrators as well as an indication, of the time where the session started by keeping the computation load within acceptable limits.

Even though the system may operate perfectly by using only digital keys and signatures of the RSA type, in the data exchange phases, the possibility exists of using special digital signatures in order to reduce the computational load. For instance, signatures of the one time type (OTS) can be used whereby the next OT key, namely the public key to be used to verify the following message, is indicated each time. Reference in that respect can be made to the article by S. Even et al. already referred to in the foregoing.

By using a reliable transport protocol (such as TCP) for the messages exchanged between the administrator computer AC and the apparatus AS, managing the corresponding session can be simplified. Implementation of a suitable mechanism in order to ensure reliability of data transport within the same application protocol does not prevent the effectiveness of the proposed protocol in respect of non-repudiation The principles adopted by the session protocol are such that each message sent is signed by the originator party and the receiving party produces a receipt message including, i.e. a receipt field including a counter-signature of that message.

Following the transmission of application data, the engine 10 in the originator is held not to send any subsequent message before having received a corresponding receipt message.

Figure 5:
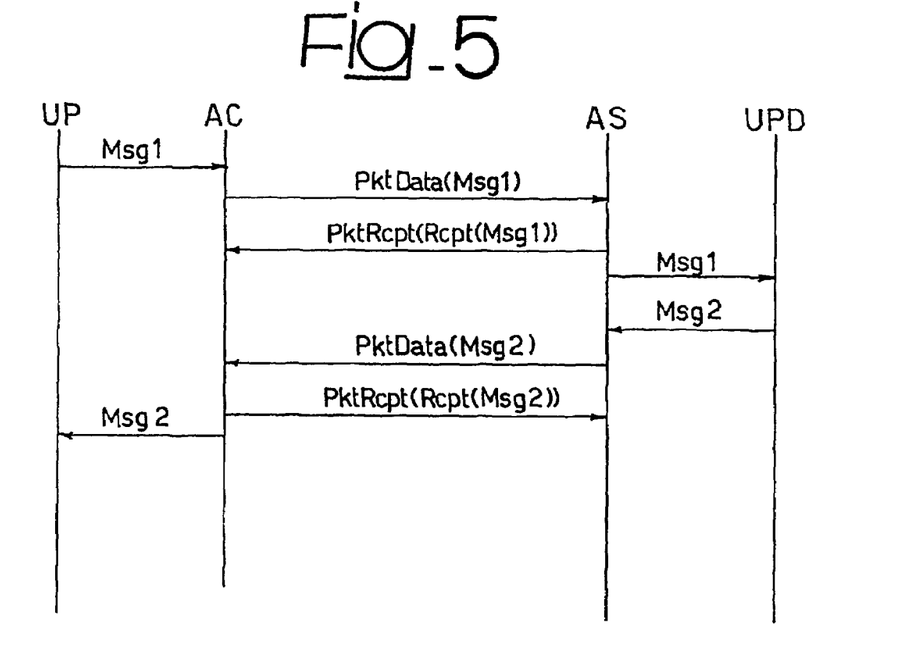

FIG. 5 portrays a corresponding sequence diagram by referring to the simplest case.

The message coming from the user process (Msg1) is forwarded by the administrator computer AC after creating the packet as described previously: in fact this is a packet PktData (Msg1) including application data only.

After verifying the message, the apparatus AS receiving such a data packet returns a packet including a receipt PktRcpt(Rcpt(Msg1)) and then forwards the application payload to the UPD. The behaviour is a thoroughly symmetric one in the case data are originated by the UPD and sent to the UP (Msg2).

The UPD is in charge of forwarding the application payload received from the administrator computer AC to the proper administered element AE using the proper communication protocol according to some parameters included in the payload data. In addition, the UPD will be in charge of receiving messages coming from the administered element (AE) and make it available to the apparatus AS for sending to the administrator computer AC.

Figure 6:
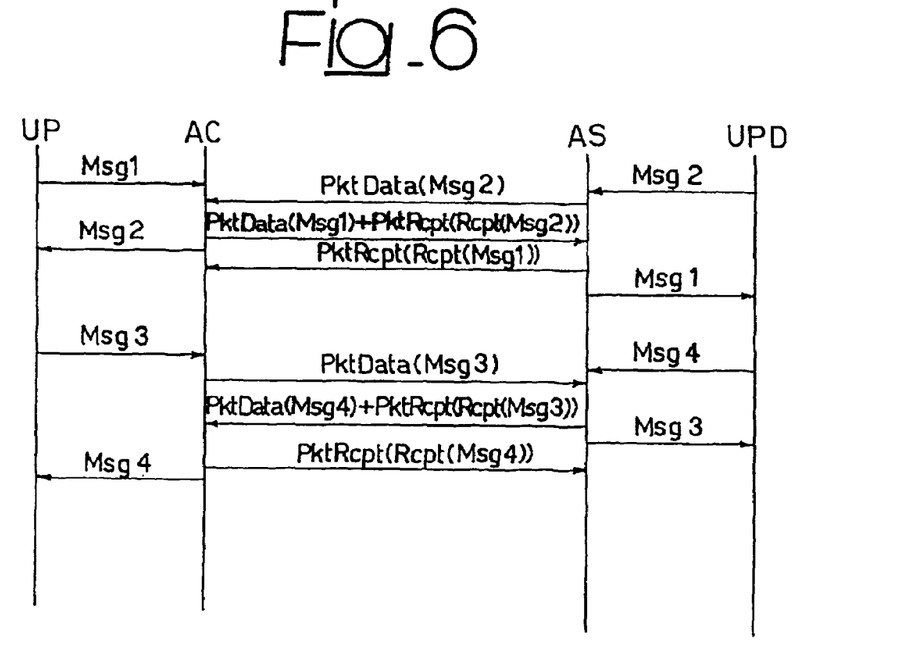
Figure 7:
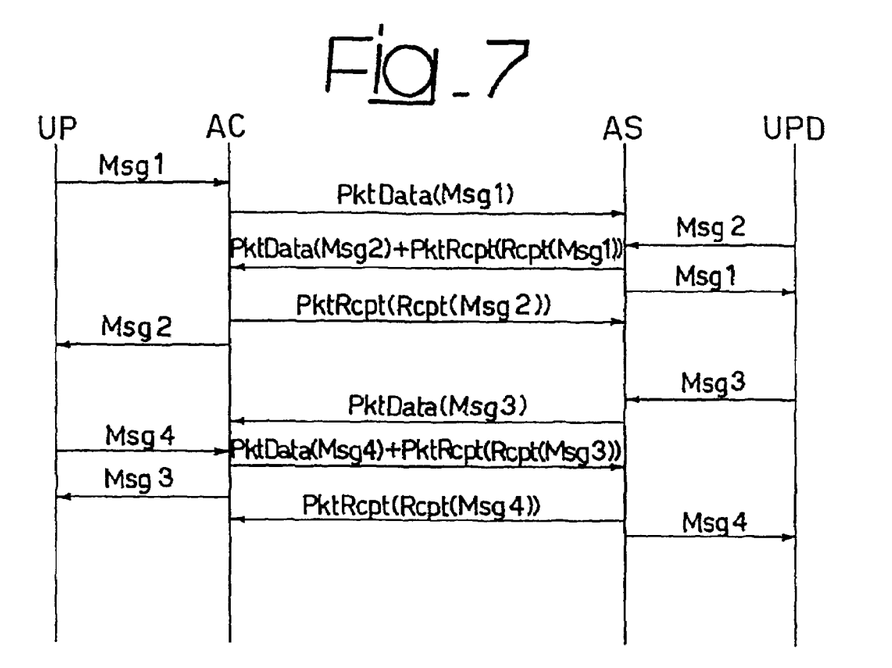
Figure 8:
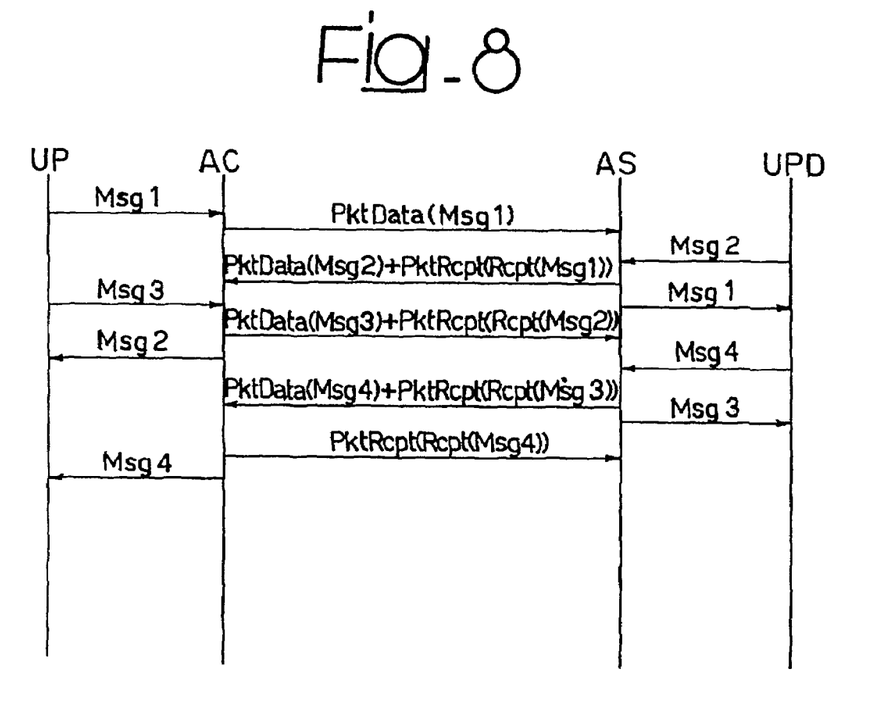

FIGS. 6, 7 and 8 represent optimized versions of the protocol that permit data packets and receipt packets to be sent in a single PDU.

Specifically, in FIGS. 6 to 8 (and 9), Msg1, Msg2, Msg3, and Msg4 represent payload data or messages, while PktData( ) represent the packets conveying such payload data and Rcpt( ) indicate corresponding receipts that are conveyed by respective packets PktRcpt( ).

Three different cases are to be considered in order to manage, both on the clients side and on the server side, different situations. Specifically, only communications related to the administrator computer AC are being considered here for the sake of simplicity. It will be appreciated that the conditions to be managed on the apparatus AS are exactly identical.

In the specific case considered in FIG. 6, before forwarding to the apparatus AS a packet from the user process (Msg1), a check is made that also a PDU has been received from the apparatus AS. In that case, a single PDU is sent including the application information from the UP and the receipt to the PDU sent from the apparatus AS, which in turn will respond by means of receipt associated with the data packet sent by the administrator computer AC. It will be appreciated that forwarding application payloads to the UP and the UPD always takes place after sending the receipt.

In a situation portrayed in FIG. 7, before sending the receipt in the face of a PDU from the apparatus AS (Msg3) a check is made that a message (Msg4) has been received from the UP. In that case, a single PDU is sent to the apparatus AS including the application information from the UP and the receipt to the PDU sent by the apparatus AS, which in turn will respond with the receipt associated with the data packet sent from the administrator computer AC.

FIG. 8 portrays a situation that is analogous to the one just considered, which however is repeated subsequently both on the server side and the client side. In that case, most of the PDUs exchanged on the tunnel are mixed PDUs, namely PDUs containing both application data and receipts.

After sending a data packet, the originator peer (AS or AC) waits for a receipt. This means that no new data packets are sent if no receipt corresponding to the last data packet sent is received.

Figure 9:
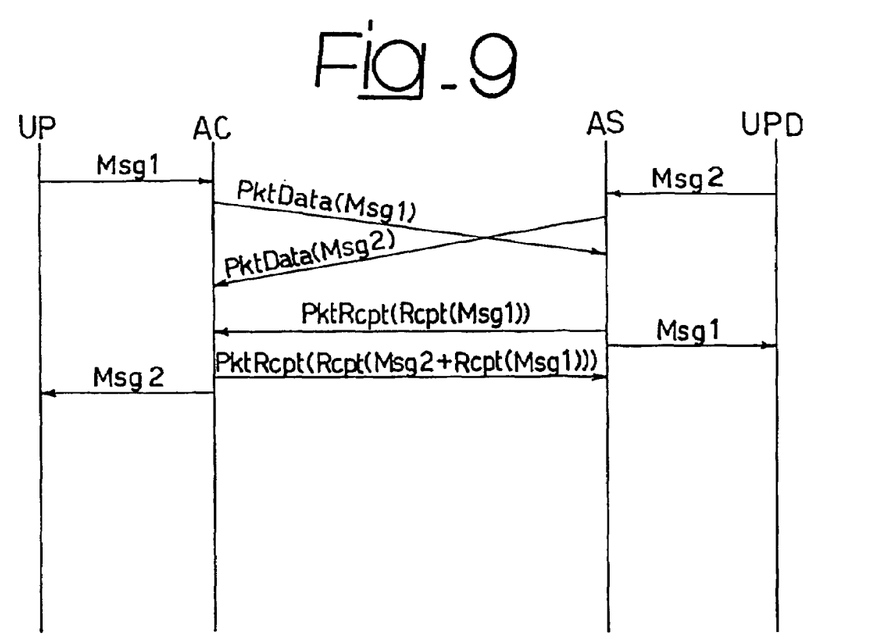

An anomalous situation may derive from the communication channel (TCP/IP) being of the full-duplex type. In that case, both the administrator computer AC and the apparatus AS may decide to send data packets simultaneously as shown in FIG. 9.

Specifically, the case may occur where the engine 10 in the apparatus AS sends a message Msg2 including application data to the engine 10 in the administrator computer AC and subsequently receives therefrom a valid message Msg1 that does not include the receipt for Msg2. The engine 10 in the apparatus AS may thus be configured in order to prepare and send a message Rcpt (Msg1) including the receipt for the message Msg1 just received and wait from the engine 10 in the administrator computer AC a message Rcpt (Msg2, Rcpt (Msg1)) including the receipt of the message sent as well as a receipt of the last receipt sent.

Similarly, the case may occur where the engine 10 in the administrator computer AC sends a message Msg1 including application data to the engine 10 in the apparatus AS and subsequently receives therefrom Msg2 failing to include a receipt for the message sent. In that case, the engine 10 in the administrator computer AC does not immediately send a receipt of the message received, but rather waits for receipt message Rcpt (Msg1) that the engine 10 in the apparatus AS prepares and sends (as described in the foregoing).

At that point a receipt message

Rcpt(Msg1,Rcpt(Msg2)) is sent from the administrator computer AC to the apparatus AS.

Using such receipts makes it possible to establish in a univoque manner the conventional relative order of the messages sent and received by the administrator computer AC and the apparatus AS.

Using such receipts is advantageous in those cases where the original application protocol between the user processes in the apparatus AS and the user processes in the administrator computer AC permit to one party or to both parties to send several messages without obtaining acknowledgment of receipt of those specific messages.

The use of a receipt messages acknowledging each and every message sent permits the originator of a given message to demonstrate to a third party the fact that he or she actually sent the message(s).

In a further embodiment, the session protocol does not provide for (receipt) messages being generated only to provide evidence of the actual receipt of a message. This solution has the advantage of requiring a smaller number of messages to be exchanged while also dispensing with the computational load related to signing, checking and storing those messages.

In the case original application protocols are used between the user process daemon in the apparatus AS and the user processes in the administrator computer AC and these protocols intrinsically support a well defined, unambiguous receipt mechanism for the messages exchanged, this last embodiment is to be preferred.

Finally, a closing phase of the AC-AS session will be described with reference to FIG. 10. This phase (which applies to all the various embodiments considered in the foregoing) has the purpose of permitting the logs concerning a session to be compacted while agreeing upon a shared history of the messages exchanged up to the last message.

The case may also arise where the administrator computer AC is no longer capable of reaching the apparatus AS (or vice versa) during the session. This may be due e.g. to malfunctioning of the network.

In that case, both the apparatus AS and the administrator computer AC detect the anomaly and close down the TCP/IP connection while leaving the session "pending".

At the following connection established between the administrator computer AC and the apparatus AS, after the initial handshake phase, an attempt is made of closing the pending session.

In order to do so a specific field ("Session To Be Closed") is exploited containing the value of the session left pending while another field ("Current Session") will include the value as determined by the new handshake phase.

It will be appreciated that in the case of a session being closed regularly, the two fields will contain the same value in that the session to be closed corresponds to the current session.

The messages involved include at least the following fields:

| Pkt Length | Pkt Type | Time | Current Session Number | Session to be closed | Session packets Hash but one Rcv | Session packets Hash Rcv | Session packets Hash but one Sent | Session Packets Hash Sent | Last Packet Sequence Number Rcv | Last Packet Sequence Number Sent | Status | Signature |
|---|---|---|---|---|---|---|---|---|---|---|---|---|

Figure 10:
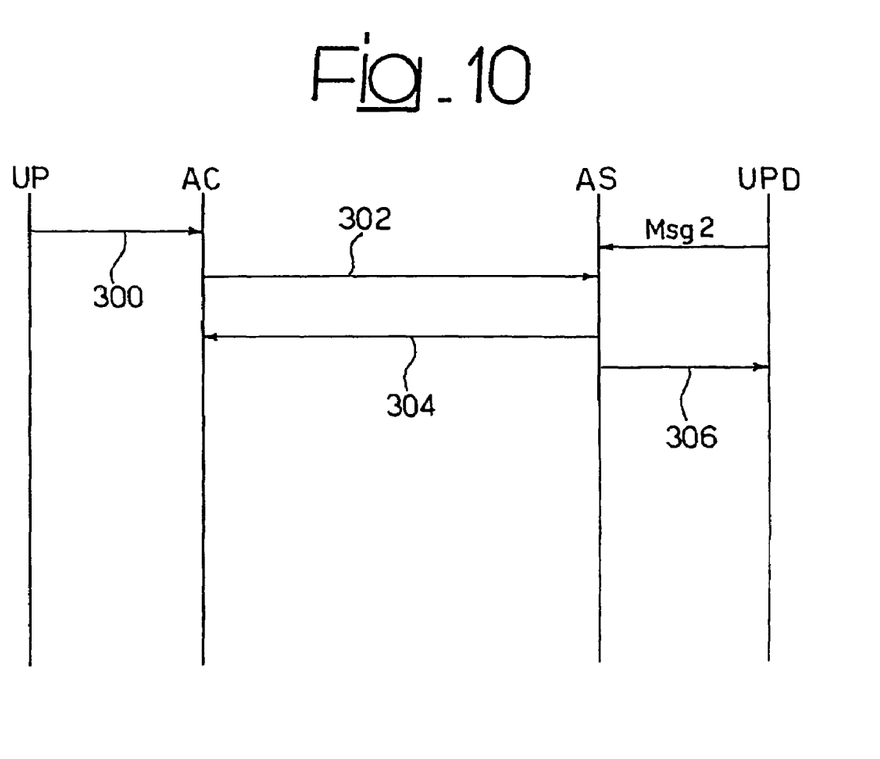

Step 300 in FIG. 10 designates a step where the user protocol UP communicates to the administrator computer AC its desire to close the connection.

In the steps designated 302 and 304, the administrator computer AC and the apparatus AS exchange packets named "Close Packets" as shown in FIG. 10 (each signed in a traditional way—for instance RSA), including the following information:

- the last sequence number for the packets sent and received,
- a concatenated hash of all the packets sent and a concatenated hash of all the packets received.
- a concatenated hash of all the packets sent but the last one and a concatenated hash of all the packets received but the last one.

After the packet exchange of steps 302 and 304, in a step 306 the apparatus AS closes communication with the user process daemon UPD.

In that way, the administrator computer AC may control that the data received are those actually sent by the apparatus AS and vice versa. Additionally, the presence of the AS signature substitutes in all respects the signatures in the packets exchanged up to the moment since the peers certified what they have actually sent.

The closing procedure is usually started when the user process UP decides to terminate the logical connection with the user process daemon UPD.

This leads to any messages possibly sent towards the apparatus AS from the user process daemon UPD and not sent towards the administrator computer AC yet (see e.g. the message Msg2 shown in FIG. 10) to be ignored.

Such a phase is run also when the administrator computer AC or the apparatus AS detects an anomaly (such as an incorrect signature for a data packet or the a receipt waited for being still missing) that may lead to the session being closed.

where

Pkt Length: packet length

Pkt Type: 16=work session requested to be closed; 32=acknowledgement of work session being closed Time: actual date and time (for instance utc time)

Current Session Number: session number derived from the session fields exchanged during the handshake phase that started the current session (for instance concatenation of the AC session number sent by the administrator computer AC in the handshake message and the AS session number sent by the apparatus AS in the handshake response message)

Session To Be Closed: number of the session for which communication is requested to be closed Session packets Hash but one Rcv: this contains the hash of the received packets but the last one, hashed in the order defined by their sequence number (after dispensing with the Receipt, Next OT Key and OT Signature fields)

Session packets Hash Rcv: this contains the hash of the received packets, hashed in the order defined by their sequence number (after dispensing with the Receipt, Next OT Key and OT Signature fields)

Session packets Hash but one Sent: this contains the hash of the received packets but the last one, hashed in the order defined by their sequence number (after dispensing with the Receipt, Next OT Key and OT Signature fields Session packets Hash Sent: this includes the hash of the packets sent, concatenated in the order defined by their sequence number (after dispensing with the receipt, Next OT key and OT Signature fields)

Last Packet Sequence Number Rcv: last sequence number of a receipt-type packet received during the session required to be closed.

Last Packet Sequence Number Sent: last sequence number for receipt-type packet sent during the session requested to be closed Status: reason of the mismatch on the history of the messages sent Signature: traditional signature for all the previous concatenated fields executed by means of the key used to sign the handshake or handshake response packet for the current session.

Generally, the administrator computer AC will not start other sessions before having received a corresponding response message (step 304 in FIG. 10) indicating that the session has been closed.

As indicated, the arrangement described herein permit communication to be arranged between a set of administrator devices AC and a given administered device AS, AE, while also permitting one or more administrator computers AC in the set to hide their identities to the administered device. Hiding of identity to the administered device may be, e.g. by means of group signatures or pseudonym digital certificates.

In the case of a session interrupted in the absence of a receipt provided by the at least one administrator AC hiding its identity to a message sent by the administered device AS, AE, the session is resumed by the administrator (AC) hiding its identity.

If the administrator computer AC detects that the Server Close message being sent from apparatus AS does not match the Client Close packet, then the administrator computer AC will keep all the previously logged packets as evidences of the exchanged PDUs; alternatively the administrator computer AC may keep the last packet received and just the previously logged packets dispensed with the receipt, in addition to the Next OT key and OT Signature fields as evidence of the exchanged PDUs.

Similarly, if the apparatus AS detects that the Client Close packet being sent from the administrator computer AC does not match the Server Close packet AS has just calculated then the apparatus AS will keep all the previously logged packets as evidences of the exchanged PDUs; alternatively the apparatus AS may keep the last packet received and just the previously logged packets dispensed with the receipt, Next OT key and OT Signature fields as evidence of the exchanged PDUs. In any case the apparatus AS will send to the administrator computer AC the corresponding Server Close Packet it has calculated including a proper Reason Code by coding in the Status field the reasons of the lack of agreement based on a pre-defined convention.

Of course, without prejudice to the underlying principle of the invention, the details and embodiments may vary, also significantly, with respect to what has been described, by way of example only. Consequently, those details here disclosed in connection with a particular embodiment of the arrangement described herein may be applied to other embodiments without departing from the scope of the invention as defined in the claims that follow.

The invention claimed is:

1. A method of arranging communication between an administrator device and an administered device in a network, comprising:

arranging said communication in the form of a chain of digitally signed communication items including messages sent from an originator device to a recipient device, each said message having associated a respective digitally signed receipt;

configuring said originator device not to send a new item toward said recipient device in the absence of a respective digitally signed receipt for a previously sent item;

detecting, at said originator device, that a respective digitally signed receipt item from said recipient device failed to reach the originator device within a given time period after a message item was issued by said originator device; and asking said recipient device for a signed statement indicating at least one of a last message item received and a last message item sent by said recipient device.

2. The method of claim 1, further comprising storing with at least one of the administrator device and the administered device, a history record of communication items exchanged therebetween, the history record being agreed upon and signed by both the administrator device and the administered device.

3. The method of claim 1, further comprising carrying out at said originator device a session closing step mentioning at least one of a last message item received and a last message item sent by said recipient device.

4. The method of claim 1, further comprising keeping with said originator device an indication of an on-going communication session as a pending session until a signed receipt item is received from said recipient device.

5. The method of claim 1, further comprising inserting in said communication items, payload data and administrative commands accompanied by respective digital signatures.

6. The method of claim 1, further comprising causing said recipient device to verify digital signatures for validity.

7. The method of claim 1, further comprising creating, by at least one of the administrator device and the administered device, digital signatures, wherein the digital signatures are under the full control of the at least one of the administrator device and the administered device that created the digital signatures.

8. The method of claim 1, further comprising associating secure digital signature evidence with said digitally signed messages and receipts.

9. The method of claim 8, wherein said secure digital signature evidence is in the form of RSA class digital signatures.

10. The method of claim 1, further comprising arranging communication between a set of administrator devices and a given administered device and permitting at least one administrator device in said set to hide its identity to said administered device.

11. The method of claim 10, further comprising hiding the identity of said at least one administrator device to said administered device by using at least one of group signatures or pseudonym digital certificates.

12. The method of claim 10, further comprising resuming a session interrupted in the absence of a receipt provided by said at least one administrator hiding its identity to a message sent by said given administered device, wherein said session is resumed by said at least one administrator hiding its identity.

13. A system comprising an administrator device and an administered device in a network, said administrator device and administered device being configured for communication in the form of a chain of digitally signed communication items including messages sent from an originator device to a recipient device, each said message having associated a respective digitally signed receipt, and wherein said originator device is configured to:

not send a new item toward said recipient device in the absence of a respective digitally signed receipt for a previously sent item;

detect that a respective digitally signed receipt item from said recipient device failed to reach the originator device within a given time period after a message item was issued by said originator device; and ask said recipient device for a signed statement indicating at least one of a last message item received and a last message item sent by said recipient device.

14. The system of claim 13, further comprising data items stored with at least one of said administrator device and said administered device, and comprising a history record of communication items exchanged therebetween, said history record being agreed upon and signed by both said administrator device and said administered device.

15. The system of claim 13, wherein said originator device is configured for carrying out a session closing step mentioning at least one of a last message item received and a last message item sent by said recipient device.

16. The system of claim 13, wherein said originator device is configured for keeping an indication of an on-going communication session as a pending session until a signed receipt item is received from said recipient device.

17. The system of claim 13, wherein said originator device is configured for inserting in said communication items payload data and administrative commands accompanied by respective digital signatures.

18. The system of claim 13, wherein said recipient device is configured for verifying said digital signatures for validity.

19. The system of claim 13, comprising means for creating, by at least one of the administrator device and the administered device, digital signatures, wherein the digital signatures are under the full control of the at least one of the administrator device and the administered device that created the digital signatures.

20. The system of claim 13, wherein secure digital signature evidence is associated with said digitally signed messages and receipts.

21. The system of claim 20, wherein said secure digital signature evidence is in the form of RSA class digital signatures.

22. The system of claim 13, comprising a set of administrator devices and a given administered device, wherein at least one administrator device in said set is configured to hide its identity to said administered device.

23. The system of claim 22, wherein said at least one administrator device is configured for hiding its identity to said administered device by using at least one of group signatures or pseudonym digital certificates.

24. The system of claim 22, wherein said at least one administrator hiding its identity is configured for resuming a session interrupted in the absence of a receipt provided by said at least one administrator hiding its identity to a message sent by said given administered device.

25. A communication network comprising an administrator device and an administered device in a network, said administrator device and administered device being configured for communication in the form of a chain of digitally signed communication items including messages sent from an originator device to a recipient device, each said message having associated a respective digitally signed receipt, and wherein said originator device is configured to:

not send a new item toward said recipient device in the absence of a respective digitally signed receipt for a previously sent item;

detect that a respective digitally signed receipt item from said recipient device failed to reach the originator device within a given time period after a message item was issued by said originator device; and ask said recipient device for a signed statement indicating at least one of a last message item received and a last message item sent by said recipient device.

26. A computer program product, loadable in the memory of at least one computer, and comprising software code portions capable of performing the steps of a method of arranging communication between an administrator device and an administered device in a network, the method comprising:

arranging said communication in the form of a chain of digitally signed communication items including messages sent from an originator device to a recipient device, each said message having associated a respective digitally signed receipt;

configuring said originator device not to send a new item toward said recipient device in the absence of a respective digitally signed receipt for a previously sent item;

detecting, at said originator device, that a respective digitally signed receipt item from said recipient device failed to reach the originator device within a given time period after a message item was issued by said originator device; and asking said recipient device for a signed statement indicating at least one of a last message item received and a last message item sent by said recipient device.

* * * * *

UNITED STATES PATENT AND TRADEMARK OFFICE
CERTIFICATE OF CORRECTION

| | |
|---|---|
| PATENT NO. | : 7,636,848 B2 |
| APPLICATION NO. | : 10/580438 |
| DATED | : December 22, 2009 |
| INVENTOR(S) | : Caprella et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Ninth Day of November, 2010

David J. Kappos
*Director of the United States Patent and Trademark Office*